United States Patent [19]

Au

[11] 3,714,471

[45] Jan. 30, 1973

[54] SINGLE-CHANNEL MIS FLIP-FLOP CIRCUIT

[75] Inventor: Kenneth K. Au, Ottawa, Ontario, Canada

[73] Assignee: Microsystems International Limited, Montreal, Quebec, Canada

[22] Filed: Nov. 24, 1971

[21] Appl. No.: 201,659

[52] U.S. Cl. ....................................307/279, 307/238

[51] Int. Cl. ................................................H03k 3/286

[58] Field of Search..............................307/238, 279

[56] References Cited

UNITED STATES PATENTS

| | | | |
|---|---|---|---|
| 3,284,782 | 11/1966 | Burns | 307/279 |
| 3,363,115 | 1/1968 | Stephenson et al. | 307/279 |
| 3,588,844 | 6/1971 | Christensen | 307/238 X |
| 3,619,665 | 11/1971 | Kosonocky | 307/279 |

*Primary Examiner*—John S. Heyman
*Attorney*—L. Brooke Keneford

[57] ABSTRACT

The present invention relates to an integrated single-channel MIS binary flip-flop circuit requiring only a single clock signal source. The clock signal varies between voltage levels adapted to enable transistors in the circuit and reference ground potential. By swinging the clock signal to reference ground potential, the requirement for either complementary MIS transistors or a combination of a clock signal supply and an inverted signal supply thereof is avoided.

5 Claims, 5 Drawing Figures

SINGLE-CHANNEL MIS FLIP-FLOP CIRCUIT

The present invention relates to an integrated single-channel MIS binary flip-flop circuit requiring only a single clock signal source.

Various configurations of single-channel MIS binary flip-flop circuits have been proposed, and representative of such circuits are the teachings of U.S. Pat. Nos. 3,573,507 (Eng) and 3,363,115, (Stevenson et al.) dated Apr. 6th, 1971 and Jan. 9th, 1968 respectively. However, the circuitry required in these prior art devices is considerable and therefore relatively unsatisfactory from the point of view of economy. Particularly disadvantageous is the requirement for a clock signal supply and a signal supply which is an inversion of the clock signal, whether or not the inverted signal is derived on-chip or exteriorly. In U.S. Pat. No. 3,555,307 (Hujita) dated Jan. 12, 1971, there is shown a flip-flop circuit requiring only a single clock signal source. However, this circuit is applicable only to the use of complementary MIS transistors and requires an undersirably large number of such devices.

The object of the present invention is to provide a single-channel binary flip-flop circuit having a relatively small number of devices and requiring a single clock-source without the requirement for inversion of that source.

Thus, according to the present invention, there is provided a single-channel MIS flip-flop circuit comprising:

first and second MIS transistors having gate drain and source electrodes, the drain electrode of said first transistor connected to the gate electrode of said second transistor and the drain electrode of said second transistor connected to the gate electrode of said first transistor, the source electrode of each of said first and second transistors connected to means adapted for connection to reference ground potential, the drain electrodes of said first and second transistors adapted for connection to first and second means adapted to derive first and second outputs therefrom respectively, said drain electrodes further being connected to means adapted for connection to a potential supply source;

third and fourth MIS transistors having drain, source and gate electrodes and means connecting the drain electrodes of said third and fourth transistors to the drain electrodes of said first and second transistors respectively;

fifth and sixth MIS transistors having drain, source and gate electrodes, the source electrodes of said fifth and sixth transistors connected to the gate electrodes of said fourth and third transistors respectively and the drain electrodes of said fifth and sixth transistors connected to the gate electrodes of said first and second transistors respectively; and terminal means adapted for connection to pulse potential supply means adapted to swing between a potential adapted to enable said fifth and sixth transistors when applied at the gate electrodes thereof and reference ground potential, said terminal means connected to the gate electrodes of said fifth and sixth transistors and to the source electrodes of said third and fourth transistors.

The invention will now be described further by way of example only and with reference to the accompanying drawings wherein.

In the following descriptions, it is to be assumed that MOS devices are employed since these are generally the most economical and effective for integrated circuitry. However, it will be appreciated that any MIS devices may be used without departing from the invention.

Figures 1, 2:
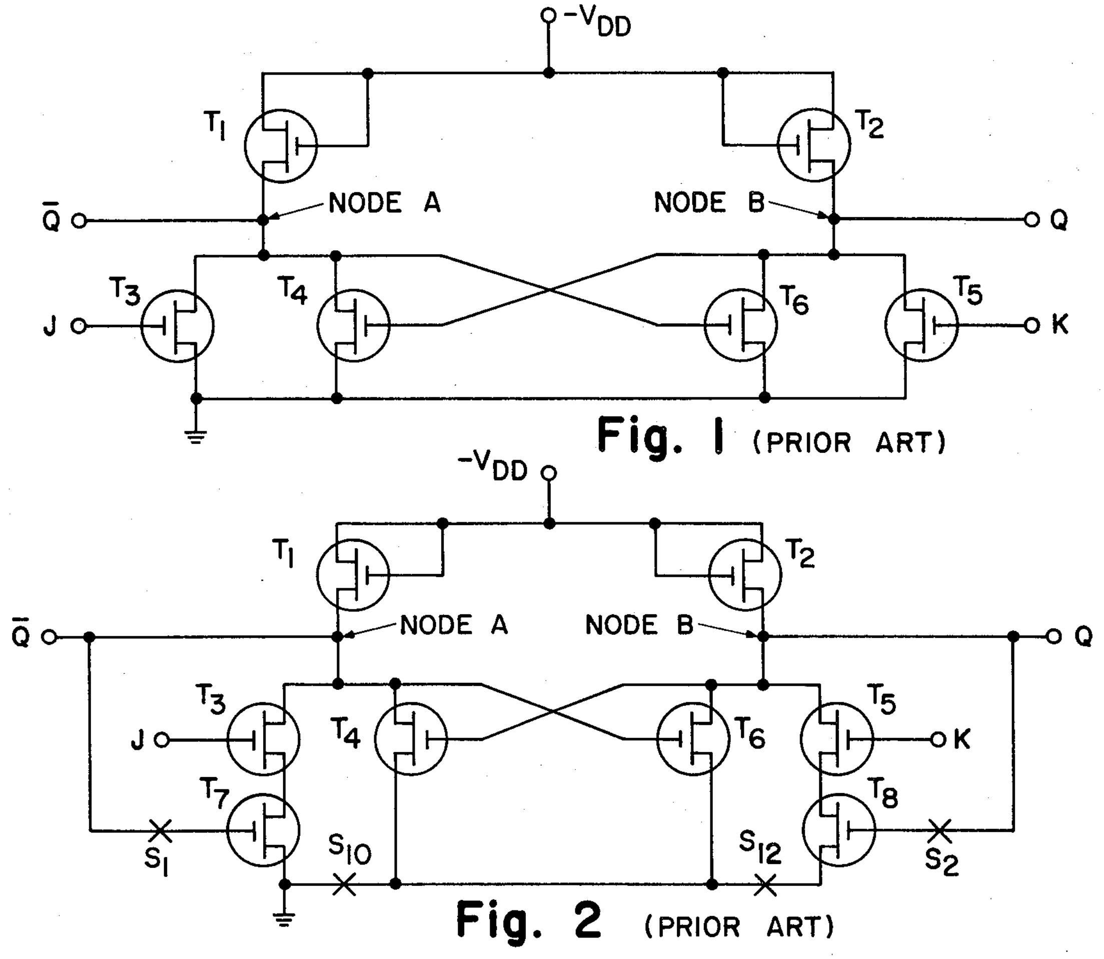
Fig. 1 (PRIOR ART) Fig. 2 (PRIOR ART)
FIG. 1 shows a basic prior art flip-flop circuit.
FIG. 2 shows the circuit of FIG. 1 with modifications thereto to illustrate a further basic type of prior art flip-flop.

Referring now to the drawings, and in particular to FIG. 1, there is shown the most basic type of flip-flop circuit using single-channel MIS transistors and with no clock signal supply. The circuit comprises transistors $T_1$ and $T_2$ having their gate and drain electrodes tied together and fed by a potential supply source designated $-V_{DD}$. The source electrodes of each of $T_1$ and $T_2$ are connected to outputs designated $\bar{Q}$ and Q respectively. The source electrode of $T_1$ is also connected to the drain electrode of a transistor $T_3$, the gate electrode of which is connected to an input terminal designated J. The source electrode of transistor $T_3$ is tied to reference ground potential. The source electrode of transistor $T_1$ is also connected to the drain electrode of a transistor $T_4$, the source electrode of which is tied to reference ground potential, and the gate electrode of which is tied to the source electrode of transistor $T_2$. The source electrode of transistor $T_2$ is connected to the drain electrode of a transistor $T_5$, the gate electrode of which is connected to an input terminal designated K, and the source electrode of which is tied to reference ground potential. The source electrode of transistor $T_2$ is also connected to the drain electrode of a transistor $T_6$, the gate electrode of which is coupled to the source electrode of transistor $T_1$, and the source electrode of transistor $T_6$ is tied to reference ground potential. The truth table for this flip-flop is as follows:

| Mode | J | K | Q |
|---|---|---|---|
| *a* | 0 | 0 | Q |
| *b* | 1 | 0 | 1 |
| *c* | 0 | 1 | 0 |
| *d* | 1 | 1 | ? |

This truth table is derived as follows.

Let it be assumed that logic level "1" represents the more negative of the two input signals which may be applied at the J and K inputs and that this input level is sufficiently negative to enable the transistors in the circuit. Also, for the sake of simplicity let it further be assumed that this level "1" is equivalent to $-V_{DD}$, and logic level "0" is equal to reference ground potential. The same code will apply to the output logic levels Q.

In mode *a*, an input of logic level "0" is applied at J to the gate of transistor $T_3$. $T_3$ does not conduct and therefore node A remains isolated from reference ground potential. The input at K is also at logic level "0." The condition of each of transistors $T_4$ and $T_6$ will be unchanged since each of nodes A and B have not been changed upon application to inputs J and K of the logic level "0" signals, and therefore the output at Q is unchanged. This is designated in the truth table as Q.

In mode *b*, the input at J changes to a logic level "1" signal, the input at K remaining at level "0." $T_3$ now conducts and node A is pulled down to reference ground potential. $T_6$ is now disabled and since $T_5$ is also disabled, node B — and therefore the output Q — attains the potential $-V_{DD}$, which is logic level "1."

In mode *c*, the input to J drops to "0" and the input at K rises to "1". Node B is now pulled down to reference ground potential as $T_5$ conducts and $T_4$ is therefore disabled. Since input J is at "0", node A rises to potential $-V_{DD}$ and $\overline{Q}$ is therefore at "1". Node B remains at "0" since both $T_5$ and $T_6$ are conducting, and therefore Q is at "0."

In mode *d*, the input at J now changes to logic level "1" and the input at K remains at logic level "1." Now, both $T_3$ and $T_5$ are conducting and each of nodes A and B are pulled down to ground potential. If now the logic level "1" signals are removed from J and K, nodes A and B are effectively floating since they are isolated from ground potential and the flip-flop will then assume one of the stable states wherein Q equals "0" or "1", but which stable state will be assumed is indeterminate.

Consider now the circuit of FIG. 2. The connection between the source electrode of transistor $T_3$ and reference ground potential is broken and series connected transistor $T_7$ and switch device $S_{10}$ inserted therein. The gate electrode of transistor $T_7$ is connected through switch means $S_1$ to output $\overline{Q}$. Similarly, a transistor $T_8$ and series connected switch means $S_{12}$ are inserted between the source electrode of transistor $T_5$ and reference ground potential, the gate electrode of transistor $T_8$ being connected through a switch means $S_2$ to output Q. Consider mode *c* of the truth table shown above, wherein J is "0", K is "1" and therefore Q is "0." Switch means $S_1$ and $S_2$ are both open (disabled) and switch means $S_{10}$ and $S_{12}$ are both closed (enabled). The flip-flop circuit now goes to mode *d* wherein J changes to logic level "1". $T_3$ is enabled, but no current can pass therethrough since $T_7$ is disabled (switch means $S_1$ is disabled). Now let switch means $S_1$ become enabled and simultaneously switch means $S_{10}$ become disabled. Since node A is at $-V_{DD}$, charge is transferred to and stored at the gate electrode of $T_7$. $T_7$ cannot conduct current therethrough since $S_{10}$ is disabled, and therefore node A remains at $-V_{DD}$ whilst $S_1$ is enabled and the gate electrode of $T_7$ is charging up. If now $S_1$ is disabled and simultaneously $S_{10}$ is enabled, the charge at the gate electrode of $T_7$ enables $T_7$ and node A is therefore clamped to reference ground potential through $T_3$, $T_7$ and $S_{10}$. Thus, node A rises to level "0." Considering now node B and bearing in mind that $S_1$ and $S_2$ are triggered simultaneously and that $S_{10}$ and $S_{12}$ are also triggered simultaneously, it will be seen that in mode *c* of the truth table, the output Q was at level "0". Since the only signal applied to the gate electrode of $T_8$ when $S_2$ is enabled is at logic level "0" (reference ground potential) $T_8$ does not conduct and therefore transistors $T_5$ and $T_8$ and switch means $S_2$ and $S_{12}$ play no part in determining the condition of node B in the transition from mode *c* to mode *d* of the truth table. Now, when node A rises to logic level "0", $T_6$ is disabled and since by this time $S_2$ is also disabled, there is no path from the source electrode of transistor $T_2$ to reference ground potential. Therefore, node B and thus output Q falls to logic level "1". Thus, the output Q in mode *c* has changed to output $\overline{Q}$ in mode *d*. Consideration of the case where a transition is made either from mode *b* to mode *d* or from mode *a* to mode *d* will show that Q always changes to $\overline{Q}$ — $\overline{Q}$ always being the alternate binary logic level to Q. The truth table for the flip-flop of FIG. 2 now becomes

| Mode | $J_n$ | $K_n$ | $Q_{n+1}$ |
|---|---|---|---|
| *a* | 0 | 0 | $Q_n$ |
| *b* | 1 | 0 | 1 |
| *c* | 0 | 1 | 0 |
| *d* | 1 | 1 | $\overline{Q}_n$ |

where $Q_{n+1}$ represents the output node Q after $n + 1$ pulses of the switch means $S_1$, $S_2$, $S_{10}$, $S_{12}$ and $Q_n$ represents the output node Q after *n* pulses of the said switch means. In practice, the switch means $S_1$ and $S_2$ are normally triggered by clock pulses, $S_{10}$ and $S_{12}$ being triggered by the inverted signals of such pulses. Thus, as stated above, in this type of flip-flop there is the need for both a clock signal supply and an inverted supply thereof, thus creating the need for extra circuitry and also requiring relatively complex switching arrangements in order to maintain the speed of operation and full output levels required. As stated above, Hujita in U.S. Pat. no. 3,555,307 overcomes the requirement for an inverted clock signal supply but requires the use of a relatively complex arrangement of complementary MIS transistors. The present invention enables the use of single-channel devices whilst eliminating the need for an inverted clock signal supply by having the clock signal supply itself swing between the enabling pulses and reference ground potential. This is exemplified below.

Figure 3:
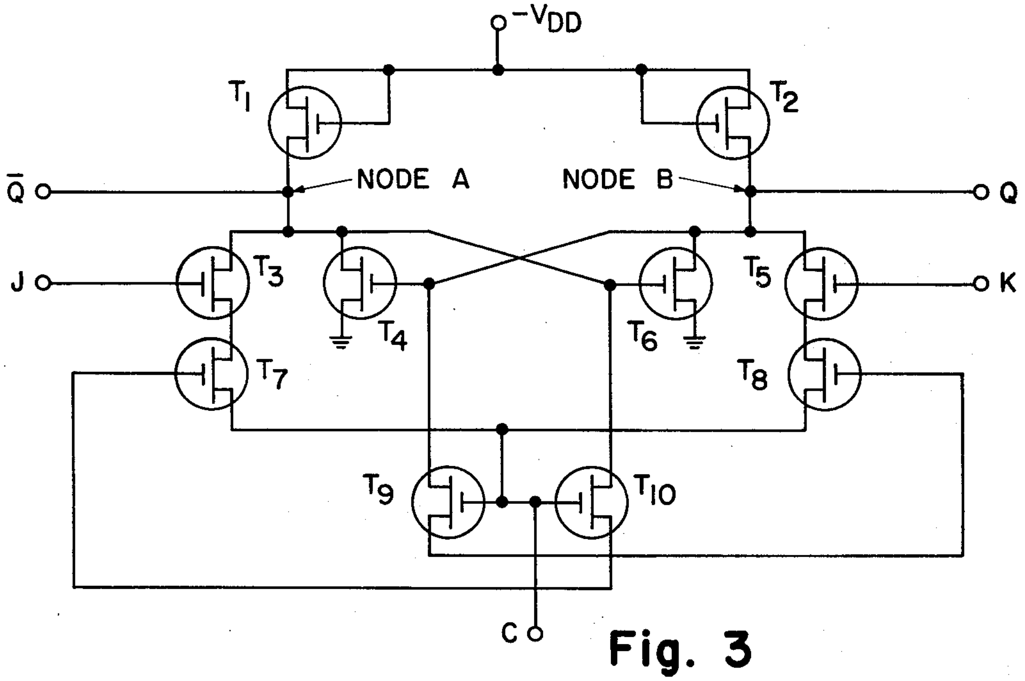
FIG. 3 shows a flip-flop circuit according to the present invention.

Considering FIG. 3 of the drawings, wherein various circuit elements are referenced in correspondence with their counter-parts in FIGS. 1 and 2, it will be seen that only four extra transistors $T_7$, $T_8$, $T_9$ and $T_{10}$ are required over the circuit of FIG. 1. The gate electrode of transistor $T_7$ is connected to the source electrode of $T_{10}$ and the drain electrode of $T_{10}$ is connected to the output $\overline{Q}$. Similarly, the gate electrode of transistor $T_8$ is connected to the source electrode of $T_9$ and the drain electrode of $T_9$ is connected to the output Q. The gates electrodes of $T_9$ and $T_{10}$ and the source electrodes of $T_7$ and $T_8$ are all connected to a clock pulse signal supply C. The clock supply C swings between enabling pulses for transistors $T_9$ and $T_{10}$ and reference ground potential for transistors $T_7$ and $T_8$.

A truth table similar to that derived for the circuit of FIG. 2 applies to FIG. 3, but now $Q_{n+1}$ represents the state of the output Q after n + 1 complete clock pulses and $Q_n$ represents the state of the output Q after n complete clock pulses. $\overline{Q}$ is of course always the alternate binary logic level to Q.

Consider firstly the transition from mode *a* to mode *b* of the truth table. $Q_{n+1}$ is at $Q_n$ in mode *a*. Let it be assumed that $Q_n$ is at logic level "1." As J swings to logic level "1," $T_3$ is enabled. At this time clock source C is at reference potential whereupon $T_9$ and $T_{10}$ are disabled. Therefore $T_7$ is disabled. Also at this time, since node B is at level "1," $T_4$ is enabled and $\overline{Q}$ is at "0" and therefore $T_6$ is disabled. K is at "0" and therefore $T_5$ is disabled.

The clock supply C is now pulsed, isolating the source electrodes of each of $T_7$ and $T_8$ from reference ground potential and enabling $T_9$ and $T_{10}$. Node A is at level "0" and no current therefore flows through $T_{10}$ to enable $T_7$. Node B is at level "1" and current therefore flows through $T_9$ and charges up the gate electrode of $T_8$. As stated, the source electrode is isolated from a reference ground potential when C is pulsed, thus allowing time for the gate electrode of $T_8$ to charge fully. C now returns to reference ground potential and the charge on the gate electrode of $T_8$ causes $T_8$ to remain enabled. However, since $T_5$ is disabled by the application at K of logic level "0," $T_8$ cannot pass current therethrough and the output Q therefore remains at logic level "1". Now let it be assumed that $Q_n$ in mode *a* was at logic level "0" and therefore $Q_n$ was at level "1". As J swings to "1", $T_3$ is enabled. $T_6$ is enabled by the node A and maintains node B at logic level "0". Clock supply C is now pulsed, enabling $T_9$ and $T_{10}$. Since node A is at logic level "1", current passes through $T_{10}$ and charges the gate electrode of $T_7$. Since node B is at "0" logic level, $T_8$ remains disabled. When C returns to reference ground potential, current passes through $T_3$ and $T_7$ and node A rises to reference ground potential — i.e., logic level "0" — thereby disabling $T_6$. Since node B is now isolated from reference ground potential, it falls to potential $-V_{DD}$ — i.e., logic level "1". Thus, no matter which binary level $Q_n$ assumes in mode *a*, in mode *b* it will always assume logic level "1".

Consider now the transition from mode *b* to mode *c* of the truth table. In mode *b*, node A is at level "0" and node B is at level "1". J now changes to an input logic level "0" and the K input swings to level "1." Thus $T_3$ is disabled and $T_5$ is enabled. When C is pulsed, node B charges up the gate electrode of $T_8$. $T_7$ remains disabled. When C returns to reference ground potential, both $T_5$ and $T_8$ are enabled and node B rises to level "0," simultaneously disabling $T_4$. Therefore node A falls to logic level "1".

Consider now the transition from mode *c* to mode *d* of the truth table. In mode *d* both J and K inputs are at logic level "1", thereby enabling $T_3$ and $T_5$. $T_6$ is enabled since node A is at "1" in mode *c* of the truth table and $T_4$ is disabled. Now, if C is pulsed, $T_9$ and $T_{10}$ are enabled and node A charges up the gate electrode of $T_7$. When C returns to reference ground potential, both $T_3$ and $T_7$ conduct and node A rises to level "0," disabling $T_6$, whereupon node B falls to logic level "1." As in the circuit of FIG. 2, it can be seen that transition of any of modes *a*, *b* or *c* to mode *d* will give an output Q which is the alternate binary output level to the preceding output level Q. Thus, in mode *d* of the truth table, $Q_{n+1}=\overline{Q}_n$.

It will therefore be seen that the above example shows a J-K flip-flop circuit according to the invention having the same switching modes as the circuit of FIG. 2 but avoiding the inversion stage required for the clock signal supply in prior art circuits of this general type. Particularly advantageous is the fact that this is achieved without departing from the economically desirable feature of using single-channel devices.

Figure 4:
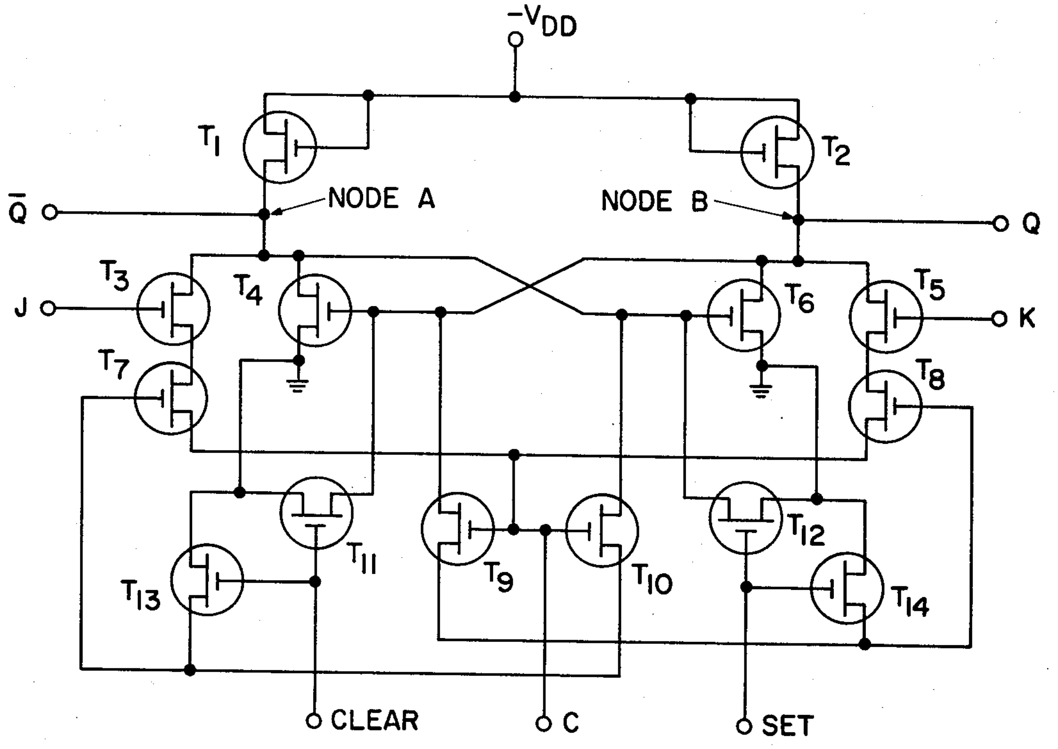
FIG. 4 shows a further flip-flop circuit according to the present invention.

Turning now to FIG. 4, there is shown the flip-flop circuit of FIG. 3 with the additional feature of CLEAR and SET inputs. A transistor $T_{11}$ is connected across transistor $T_4$, the drain electrode of $T_{11}$ being connected to the gate electrode of $T_4$ and the source electrode of $T_{11}$ being connected to the source electrode of $T_4$. The source electrode of $T_{11}$ is also connected to the drain electrode of a transistor $T_{13}$, the source electrode of which is connected to the gate electrode of transistor $T_7$. The gate electrodes of $T_{11}$ and $T_{13}$ are connected to a CLEAR input terminal. A transistor $T_{12}$ is connected across transistor $T_6$, the drain electrode of $T_{12}$ being connected to the gate electrode of $T_6$ and the source electrode of $T_{12}$ being connected to the source electrode of $T_6$. The source electrode of $T_{12}$ is connected to the drain electrode of a transistor $T_{14}$, the source electrode of which is connected to the gate electrode of transistor $T_8$. The gate electrodes of $T_{12}$ and $T_{14}$ are connected to a SET input terminal.

Assume that node A is at logic level "1" and node B is at level "0." A SET pulse is now applied enabling $T_{14}$ and $T_{12}$. Node A is pulled up to reference ground potential — logic level "0" — and simultaneously node B is pulled down to logic level "1." Also, any charge at the gate electrode of $T_8$ which would cause $T_8$ to conduct current therethrough clamping node B to reference ground potential ($K$ = "1," therefore $T_5$ is enabled) is discharged to reference ground potential through $T_{14}$, thus disabling $T_8$. Now node A is at level "0" and node B is at level "1." A CLEAR signal applied at the gate electrodes of $T_{11}$ and $T_{13}$ will function in analogous manner to the SET input and will return node B to level "0" and node A to level "1" by grounding node B through $T_{11}$ and by discharging the gate electrode of $T_7$ through $T_{13}$ to reference ground potential.

Figure 5:
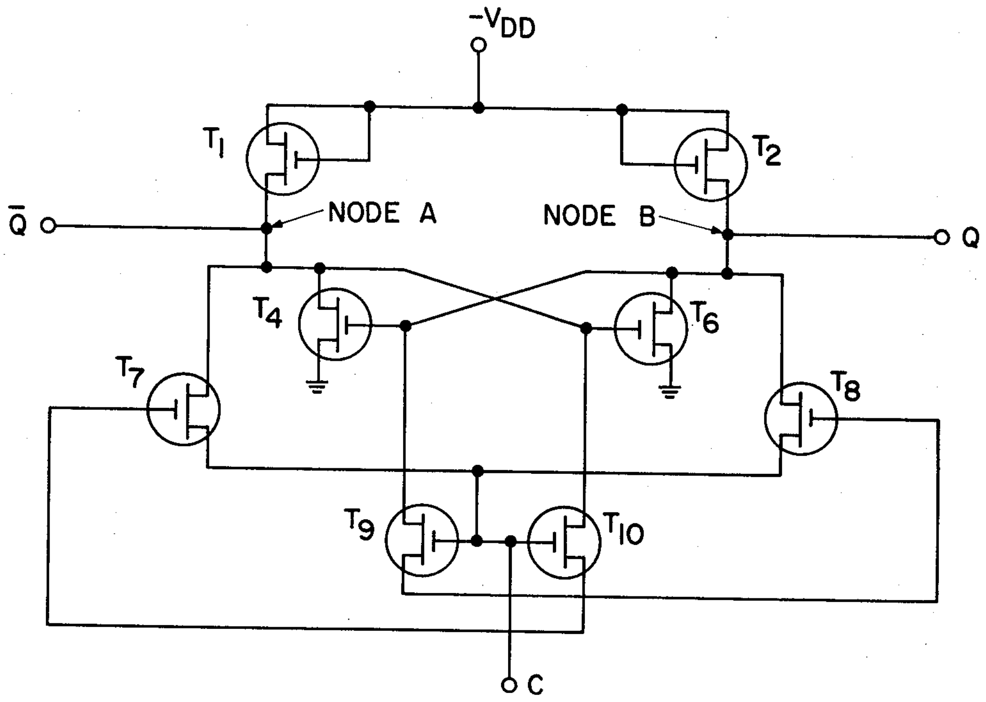
FIG. 5 shows a frequency-divider circuit according to the present invention.

FIG. 5 shows a frequency divider circuit which is in fact a special case of the circuit of FIG. 3 wherein J and K inputs are both at logic level "1" and transistors $T_3$ and $T_5$ are therefore eliminated. Assume node B is at logic level "1" and node A is at logic level "0." When clock source C is pulsed, $T_9$ conducts current to charge the gate electrode of $T_8$. When C returns to reference ground potential, $T_8$ is enabled and node B rises to reference ground potential, disabling $T_4$ and pulling node A down to logic level "1." When C is pulsed again, the nodes are again reversed and so on. Thus if C is pulsed with a frequency $f$, each of Q and $\overline{Q}$ will provide alternate outputs swinging between logic level "0" AND "1" with a frequency $f/2$.

The circuits described in connection with this invention have utilized P-channel silicon-gate MOS devices. However, N-channel devices can equally well be used with appropriate modification of the supply voltage $V_{DD}$ polarity.

It will be appreciated that various modifications and embodiments of the invention will be apparent to those skilled in the art without departing from the spirit and scope of the invention described and claimed herein.

What is claimed is:

1. A single-channel MIS flip-flop circuit comprising: first and second MIS transistors having gate, drain and source electrodes, the drain electrode of said first transistor connected to the gate electrode of said second transistor and the drain electrode of said second transistor connected to the gate electrode of said first transistor, the source electrode of each of said first and second transistors connected to means adapted for connection to reference ground potential, the drain electrodes of said first and second transistors adapted for connection to first and second means adapted to derive first and second outputs therefrom respectively, said drain electrodes further being connected to means adapted for connection to a potential supply source;

third and fourth MIS transistors having drain, source and gate electrodes and means connecting the drain electrodes of said third and fourth transistors to the drain electrodes of said first and second transistors respectively;

fifth and sixth MIS transistors having drain, source and gate electrodes, the source electrodes of said fifth and sixth transistors connected to the gate electrodes of said fourth and third transistors respectively and the drain electrodes of said fifth and sixth transistors connected to the gate electrodes of said first and second transistors respectively; and terminal means adapted for connection to pulse potential supply means adapted to swing between a potential adapted to enable said fifth and sixth transistors when applied at the gate electrodes thereof and reference ground potential, said terminal means connected to the gate electrodes of said fifth and sixth transistors and to the source electrodes of said third and fourth transistors.

2. The circuit of claim 1 wherein said drain electrodes of said first and second transistors are adapted for connection to said potential supply source through load means comprising seventh and eighth MIS transistors each having a source electrode and interconnected gate and drain electrodes, said source electrode of said seventh transistor being connected to the drain electrode of said first transistor and the source electrode of said eighth transistor being connected to the drain electrode of said second transistor, the drain electrode of each of said seventh and eighth transistors being connected to means adapted for connection to said potential supply means.

3. The circuit of claim 2 wherein said MIS transistors are silicon-gate MOS transistors.

4. The circuit of claim 2 wherein said means connecting the drain electrode of said third transistor to the drain electrode of said first transistor comprises a ninth MIS transistor having source drain and gate electrodes, the drain electrode of said ninth transistor being connected to the drain electrode of said first transistor and the source electrode of said ninth transistor being connected to the drain electrode of said third transistor and said means connecting the drain electrode of said fourth transistor to the drain electrode of said second transistor comprises a tenth MIS transistor having source drain and gate electrodes, the drain electrode of said tenth transistor being connected to the drain electrode of said second transistor and the source electrode of said tenth transistor being connected to the drain electrode of said fourth transistor;

said first input signal supply means being a binary signal supply adapted to selectively supply first and second input signals of more or less negative logic levels respectively to the gate electrode of said ninth transistor adapted to selectively enable and disable said ninth transistor, and said second input signal supply means being a binary signal supply adapted to selectively supply first and second input signals of more or less negative logic levels respectively to the gate electrode of said tenth transistor adapted to selectively enable and disable said tenth transistor.

5. The circuit of claim 1 further comprising:

eleventh and twelfth MIS transistors each having drain, source and gate electrodes, the drain electrode of said eleventh transistor connected to the gate electrode of said first transistor and the source electrode of said eleventh transistor connected to reference ground potential, the drain electrode of said twelfth transistor connected to reference ground potential, the source electrode of said twelfth transistor connected to the gate electrode of said third transistor, the gate electrodes of said eleventh and twelfth transistors being interconnected and connected to means adapted for connection to means for applying a CLEAR signal to said flip-flop circuit; and thirteenth and fourteenth MIS transistors each having drain, source and gate electrodes, the drain electrode of said thirteenth transistor connected to the gate electrode of said second transistor and the source electrode of said thirteenth transistor connected to reference ground potential, the drain electrode of said fourteenth transistor connected to reference ground potential, the source electrode of said fourteenth transistor connected to the gate electrode of said fourth transistor, the gate electrodes of said thirteenth and fourteenth transistors being interconnected and connected to means adapted for connection to means for applying a SET signal to said flip-flop circuit.

* * * * *